Feb. 2, 1932.  C. S. FRANCIS, JR  1,843,419
TELEMETER
Filed Aug. 16, 1929
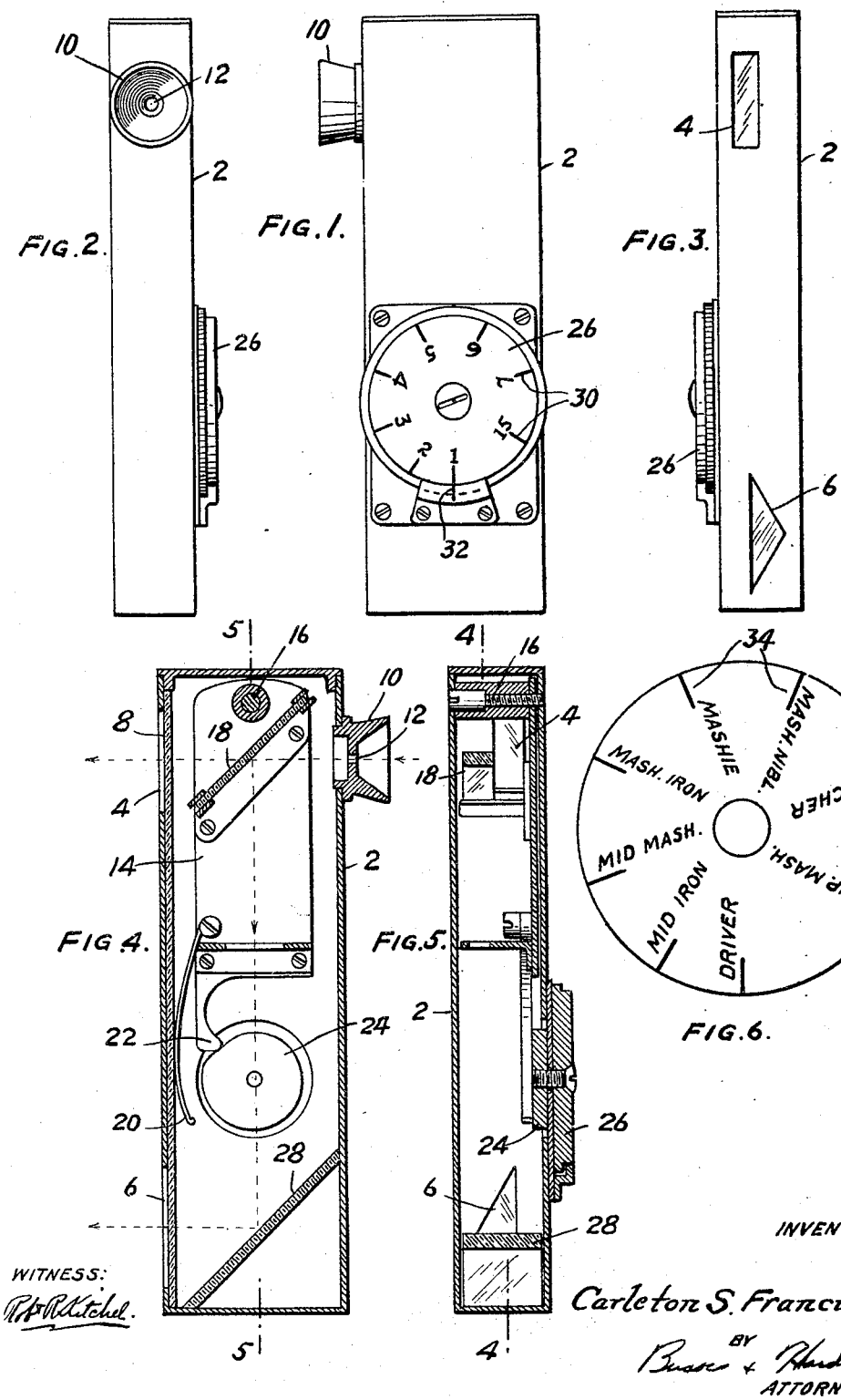

Patented Feb. 2, 1932

1,843,419

UNITED STATES PATENT OFFICE

CARLETON S. FRANCIS, JR., OF PHILADELPHIA, PENNSYLVANIA

TELEMETER

Application filed August 16, 1929. Serial No. 386,249.

This invention relates to a telemeter, and particularly refers to a small portable type graduated to indicate the proper golf club to be used to drive a ball to a distant location.

As is well known, a series of different clubs are used in golf which are adapted to be used under varying conditions and for driving a golf ball different distances, as may be required. It is sometimes difficult to determine the distance from a mere observation of the goal and it is accordingly the object of the present invention to provide a device whereby the distance or the proper club to be used may be automatically indicated. As the device is graduated directly to indicate the proper club to be used, it will be clear that it is not necessary to indicate the distance; nor is any reference to a table indicating the relationship between the clubs and distances necessary.

In the accompanying drawings, which indicate a preferred embodiment of the invention, Fig. 1 is a plan view of the device; Fig. 2 is a front elevation thereof; Fig. 3 is a rear elevation; Fig. 4 is a section on line 4—4 of Fig. 5; Fig. 5 is a section on line 5—5 of Fig. 4; and Fig. 6 is a plan view of a dial graduated in a different manner from that disclosed in Fig. 1.

The device comprises a suitable casing 2 in the form of a box, preferably made in a manner so as to exclude dust. The box is provided on one side with two apertures 4 and 6 of the shape indicated in Fig. 3 and arranged as therein disclosed. A sheet of glass 8, which may extend the full length of the box serves to close both of the apertures to prevent entrance of dust. Opposite the opening 4 there is located a suitable light-excluding eyepiece 10 provided with a small opening 12 providing a line of vision, as indicated in dotted lines in Fig. 4, through the opening.

Pivoted within the case upon a suitable pivot pin or screw 16 is a lever member 14 carrying a mirror 18 arranged, as shown more clearly in Fig. 5, below the level of the opening 4 at an angle of approximately 45° with the longitudinal axis of the case. A spring 20 serves to move the lever 14 so as to press the cam following extension 22 thereof against the periphery of a cam 24, which is secured by means of a screw to a dial 26 located above the top of the case, the screw passing through an opening in the wall of the case to thereby provide a pivotal support for the cam and dial. Within the end of the case opposite the eyepiece 10 is a mirror 28 located at an angle of 45° with respect to the longitudinal axis of the case and arranged to reflect light entering through an aperture 6 upon the mirror 18, from which it will be reflected through the opening 12 in the eyepiece.

By reason of the fact that openings 4 and 6 are vertically offset with respect to each other, it will be seen that two images of a distant object will be visible to an observer peering through the opening 12 of the eyepiece. By manual adjustment of dial 26, rotation of cam 24 is effected, serving to pivot lever 14 about 16 as center. By this means the upper and lower images may be caused to relatively move transversely of each other. By sighting through the eyepiece upon a vertical object, such as, for example, a tree or a vertical pole, or the like, the upper and lower images of the object may be brought into vertical coincidence. At this time the position of the dial 26 will be proportional to the distance of the object viewed.

In the modification shown in Fig. 1, the dial is graduated as indicated at 30, the numbers corresponding to the various marks indicating the number of the club to be used in driving through the distance to the object under observation. A mark 32 carried by a member secured to the case indicates the mark 30 corresponding to the required distance. For example, if, after the images are properly alined, the mark 32 is located between the marks numbered 3 and 4 on the dial, it would be suggested to the player to use either a number 3 or 4 club, or preferably that one to which the mark 32 more closely approximates on the dial. The indication thus obtained would be normal, although, of course, extraordinary circumstances might dictate the preferable use of another club.

In Fig. 6 there is indicated a different form of dial in which the markings 34 are designated by the familiar names of the clubs, rather than the numbers. This form of dial may be used alternatively with the other form, as may be most convenient.

In order to indicate at a glance the distances and the corresponding numbers and names of the clubs, a table such as the following may be engraved or otherwise marked upon the case:

| Yards | Club number | Club name |
|---|---|---|
| 185–200 | 1 | Driving iron |
| 175–185 | 2 | Mid iron |
| 155–165 | 3 | Mid mashie |
| 145–155 | 4 | Mashie iron |
| 135–145 | 5 | Mashie |
| 125–135 | 6 | Mashie niblick |
| 120–130 | 7 | Pitcher |
| 90–110 | 15 | Chip mashie |

While a preferred form of telemeter is disclosed, it will be obvious that the type of graduations disclosed and claimed may be applied to other forms of telemeter.

Having now fully described my invention, what I claim and desire to protect by Letters Patent is:

A telemeter including means adjustable to bring into relative positions a plurality of views of a distant object, and a manually operable dial for adjusting said means graduated to indicate a proper golf club to be used to drive a ball to the object under observation.

In testimony of which invention, I have hereunto set my hand, at Philadelphia, Pennsylvania, on this 12th day of August, 1929.

CARLETON S. FRANCIS, Jr.